(12) United States Patent
Blanchet et al.

(10) Patent No.: US 6,413,665 B1
(45) Date of Patent: Jul. 2, 2002

(54) FUEL CELL STACK COMPRESSION SYSTEM

(75) Inventors: Scott Blanchet, Monroe; Michael Cramer; Richard P. Hayes, both of New Milford, all of CT (US)

(73) Assignee: FuelCell Energy, Inc., Danbury, CT (US)

( * ) Notice: Subject to any disclaimer, the term of this patent is extended or adjusted under 35 U.S.C. 154(b) by 0 days.

(21) Appl. No.: 09/651,921

(22) Filed: Aug. 31, 2000

(51) Int. Cl.[7] ................................................ H01M 8/02
(52) U.S. Cl. ........................................................ 429/37
(58) Field of Search ................................ 429/12, 30–39

(56) References Cited

U.S. PATENT DOCUMENTS

| | | |
|---|---|---|
| 4,430,390 A | 2/1984 | Fekete |
| 4,692,391 A | 9/1987 | Hirota |
| 5,484,666 A * | 1/1996 | Gibb et al. |
| 5,686,200 A | 11/1997 | Barton et al. |
| 5,773,160 A * | 6/1998 | Wilkinson et al. |
| 5,789,091 A | 8/1998 | Wozniczka et al. |
| 5,804,326 A * | 9/1998 | Chow et al. |
| 6,086,643 A * | 7/2000 | Clark et al. |
| 6,270,917 B1 * | 8/2001 | Maeda et al. |

FOREIGN PATENT DOCUMENTS

JP  61-148770 A  *  7/1986

* cited by examiner

*Primary Examiner*—Patrick Ryan
*Assistant Examiner*—Susy Tsang-Foster
(74) *Attorney, Agent, or Firm*—Robin, BLecker & Daley

(57) ABSTRACT

A fuel cell stack compression system in which a spring assembly and mechanical linkage assembly are used in conjunction with tie rods and tie bars to apply a compressive load to a fuel cell stack. The linkage assembly includes a lever and three pins to redirect the force or movement generated by the spring assembly into a movement or force for the tie rods. The tie rods, in turn, connect to the tie bars which span the top end plate of the fuel cell stack and transfer the load to the stack. The linkage also includes a slotted bearing which compensates for the circular arc formed by the lever and allows the spring assembly to be rigidly mounted under the bottom end plate. The spring assembly comprises multiple springs arranged in parallel and designed to provide a non-linearly decreasing load as the stack compresses due to cell consolidation. This load profile reduces overall stack shrinkage while providing high pressure at the beginning of life to insure proper cell-to-cell contact.

24 Claims, 5 Drawing Sheets

FUEL CELL STACK COMPRESSION SYSTEM

BACKGROUND OF THE INVENTION

This invention relates to fuel cells and, in particular, to methods and apparatus for maintaining a compressive load on stacks of such fuel cells. More specifically, the invention relates to methods and apparatus for maintaining a compressive load in high temperature systems such as molten carbonate and solid oxide fuel cell stacks.

A fuel cell is a device which directly converts chemical energy stored in a fuel such as hydrogen or methane into electrical energy by means of an electrochemical reaction. This differs from traditional electric power generating methods which must first combust the fuel to produce heat and then convert the heat into mechanical energy and finally into electricity. The more direct conversion process employed by a fuel cell has significant advantages over traditional means in both increased efficiency and reduced pollutant emissions.

In general, a fuel cell, similar to a battery includes a negative (anode) electrode separated by an electrolyte which serves to conduct electrically charged ions between them. In contrast to a battery, however, a fuel cell will continue to produce electric power as long as fuel and oxidant are supplied to the anode and cathode, respectively. To achieve this, gas flow fields are produced adjacent to the anode and cathode through which fuel and oxidant gas are supplied. In order to produce a useful power level, a number of individual fuel cells must be stacked in series with an electrically conductive separator plate in between each cell.

In the present state of the art, a fuel cell stack may have several hundred cells in series. In order to work properly, intimate contact must be maintained between all cells in the stack. Also this contact must continue during all stack operating conditions for the duration of the stack's life. Factors to be considered in achieving this requirement include manufacturing tolerances of the cell components, non-uniform thermal expansion of the cell components during operation and long term consolidation of the cell components resulting in shrinkage of the stack.

Accordingly, a variety of requirements are placed on the system used to compress the fuel cell stack. The system must apply enough load to overcome the manufacturing tolerances early in life to bring the cell components into intimate contact. It also must be great enough during operation to prevent the cells from delaminating due to the inevitable thermal gradients within the stack. At the same time, the compression system load should not be so great as to cause excessive shrinkage of the stack during its life as this places undue demands on auxiliary stack hardware and on the required follow-up of the compression system itself An additional requirement is that the system does not completely relax over time to insure that adequate stack pressure is maintained through the end of life.

Conventional fuel cell stack designs use one of a number of mechanisms for applying compressive load to the stack. U.S. Pat. No. 4,430,390 describes spring members which run within the manifolds of the fuel cell stack attaching to the endplates and forcing them toward each other. This design is not desirable for high temperature systems such as molten carbonate and solid oxide stacks because the spring members would need to be excessively large and be constructed of exotic, corrosion resistant materials to withstand the high temperature environment. U.S. Pat. No. 4,692,391 describes a design where the end plates are directly connected by rigid tensile members such as bolts or threaded rods. However, this system provides practically no load following capability to maintain stack compression as it shrinks.

U.S. Pat. No. 5,686,200 describes small, twisted wire or ribbon springs which may be used to apply load to individual cells within a stack. This design is inappropriate for large area fuel cells as the separator plates to which the springs are attached could not be constructed stiff enough to insure adequate load was delivered to the central area of the cells. U.S. Pat. No. 5,789,091 describes the use of continuous compression bands which are wrapped around the stack and placed in tension. Again, this method suffers from inadequate follow-up for stacks with significant long term creep.

Other methods of stack compression commonly used in the field include placing coil or belleville disk springs in compression at the end of a set of stiff tie rods which tie the opposing stack end plates together. Another design utilizes flexible bars to span the opposing end plates which are again connected by rigid rods to form leaf springs. These designs suffer from either inadequate follow-up or inadequate load capability for present state of the art, large scale, high temperature fuel cell stacks.

A more complex system, previously employed by the assignee of the subject application, uses rigid tie bars to span the top end plate. Rigid tie rods are connected to the tie bars and to a mechanical linkage near the bottom of the stack. This linkage connects the tie rods to a spring assembly in the form of a belleville disk pack located under the bottom end plate. Insulating layers are used to protect the spring assembly from excessive temperature during service. In this system the spring and linkage are designed so as to apply a fairly constant load to the stack during its life. Additionally, to accommodate the geometry of the mechanical linkage, the spring assembly is designed to rotate about one of its ends during operation.

This design has the limitations of causing excessive stack shrinkage and requiring extra space under the stack to accommodate rotation of the spring assembly. Another limitation of this design lies in the high cost associated with the numerous, large belleville disks which make up the spring assembly. Finally, the design presents safety concerns, since the disks of the spring assembly must be preloaded prior to installation in order to generate a relatively constant load profile.

It is therefore an object of the present invention to provide a fuel cell stack compression system which overcomes the above disadvantages of the prior art systems.

It is a further object of the present invention to provide a fuel cell stack compression system with desirable load-deflection characteristics applicable to large, high temperature fuel cell stacks;

It is also an object of the present invention to provide fuel cell stack compression system with minimized space requirements under the fuel cell stack;

It is yet a further object of the present invention to provide a fuel cell stack compression system having reduced costs; and It is also an object of the present invention to provide fuel cell stack compression system which is safe to use.

SUMMARY OF THE INVENTION

In accordance with the principles of the present invention, the above and other objectives are realized in a compression system for providing a compressive force to a fuel cell stack in which the compression system includes one or more members each connected to a first end of the stack and extending to the opposite second end of the stack and a coupling mechanism situated adjacent the second end of the stack and including for each of the one or more members a spring assembly and a linkage assembly together adapted to cause translation movement provided by the spring assembly to be converted into a movement of the associated member in a direction between the first and second ends of the stack without rotation of the spring assembly. In this way, a desired compressive force can be maintained between the ends of the stack by the one or more members as the stack geometry changes.

In the embodiment of the invention to be disclosed hereinafter, the spring assembly is horizontally situated under the second end of the fuel cell stack and includes a fixed base plate and a translatable captivating plate between which the one or more springs of the assembly are situated. A shaft extends horizontally through the center of the springs and a first end of the shaft is attached to the captivating plate and a second end engages the linkage assembly. The latter assembly includes a lever arm, first, second and third pins and a slotted bearing. The first pin is rotationally mounted at one end of the lever arm and is connected to the end of the associated member. The second pin serves as the pivot point for the lever arm and is rotationally mounted to a base frame. The third pin is rotationally mounted to the second end of the lever arm and is situated in the slot of the slotted bearing. The bearing, in turn, is engaged by the second end of the shaft of the spring assembly.

With this configuration, the horizontal translation of the one or more springs of the spring assembly is carried to the captivating plate and from the captivating plate to the shaft of the spring assembly. The horizontal translation of the shaft is then carried by the shaft to the bearing and from the bearing to the third pin. This causes the pin to undergo both horizontal translation and translation in the orthogonal direction, i.e. vertical translation, due to rotation of the lever arm about the second pin. These translations are then imparted to the first pin at the first end of the lever. This, in turn, causes the associated member to undergo a vertical translation, which translation maintains the desired compressive force on the fuel cell stack In a further aspect of the invention, a plurality of concentric springs of different length are used in the spring assembly to realize a desired non-linear, decreasing compressive load on the fuel cell stack.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
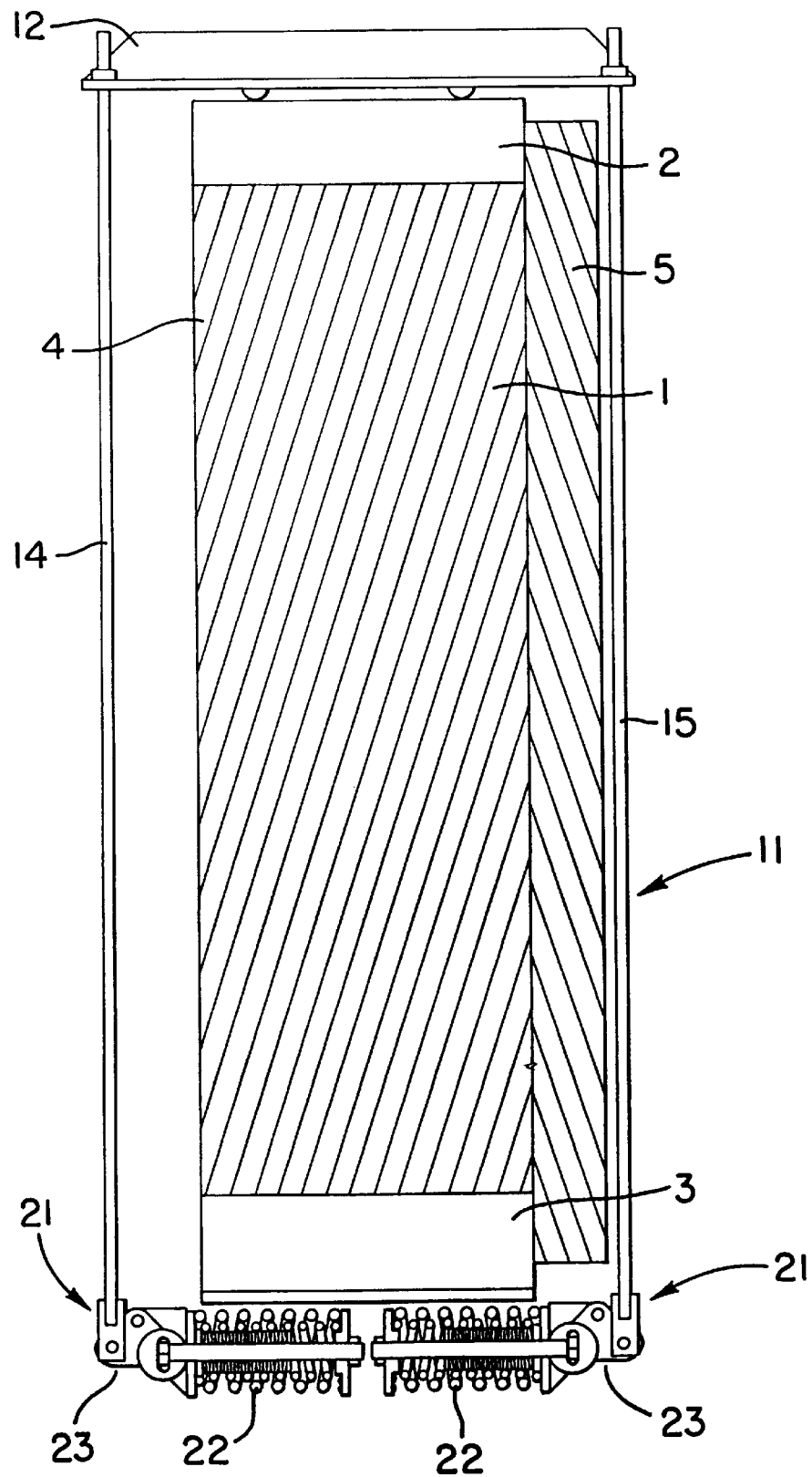
FIG. 1 is an elevation view of a fuel cell stack utilizing a fuel cell stack compression system in accordance with the principles of the present invention.

FIG. 1 shows a fuel cell stack 1 having end plates 2 and 3, between which are stacked the fuel cells 4 of the stack. One or more manifolds 5 are provided for supplying and extracting gases from the stack The stack 1 might typically be a high temperature system such as, for example, a molten carbonate or solid oxide type system In order to maintain the fuel cells 4 of the stack 1 in intimate contact, a fuel cell stack compression system 11 in accordance with the principles of the present invention is provided. More particularly, the compression system 11 causes compressive forces to be supplied to the stack between the end plates 2 and 3 over the life of the stack in such a way as to accommodate for changes in the stack geometry and, in particular, the stack vertical height or length.

As shown, the compression system 11 includes rigid tie bars 12 and 13 spanning opposite ends of the top end plate 2. In FIG. 1, only the tie bar 12 is observable as the tie bar 13 is situated behind it in the view shown. Connected to each end of each tie bar is a connecting member in the form of a rigid tie rod which extends along the face of the stack from the first end plate 2 to the second end plate 3. In FIG. 1, only tie rods 14 and 15 connected to the ends of tie bar 12 are visible with the tie rods 16 and 17 connected to the ends of the tie bar 13 again being invisible in the view shown.

In accordance with the principles of the invention, the compression system 11 further includes coupling mechanisms 21 situated at the ends of the tie rods 14–17 adjacent the second end plate 3 of the stack 1. The coupling mechanisms 21 are of like configuration and are adapted to maintain a desired compression force on the stack 1 through forces applied to the stack via the tie rods 14–17 and tie bars 12–13.

Figure 2:
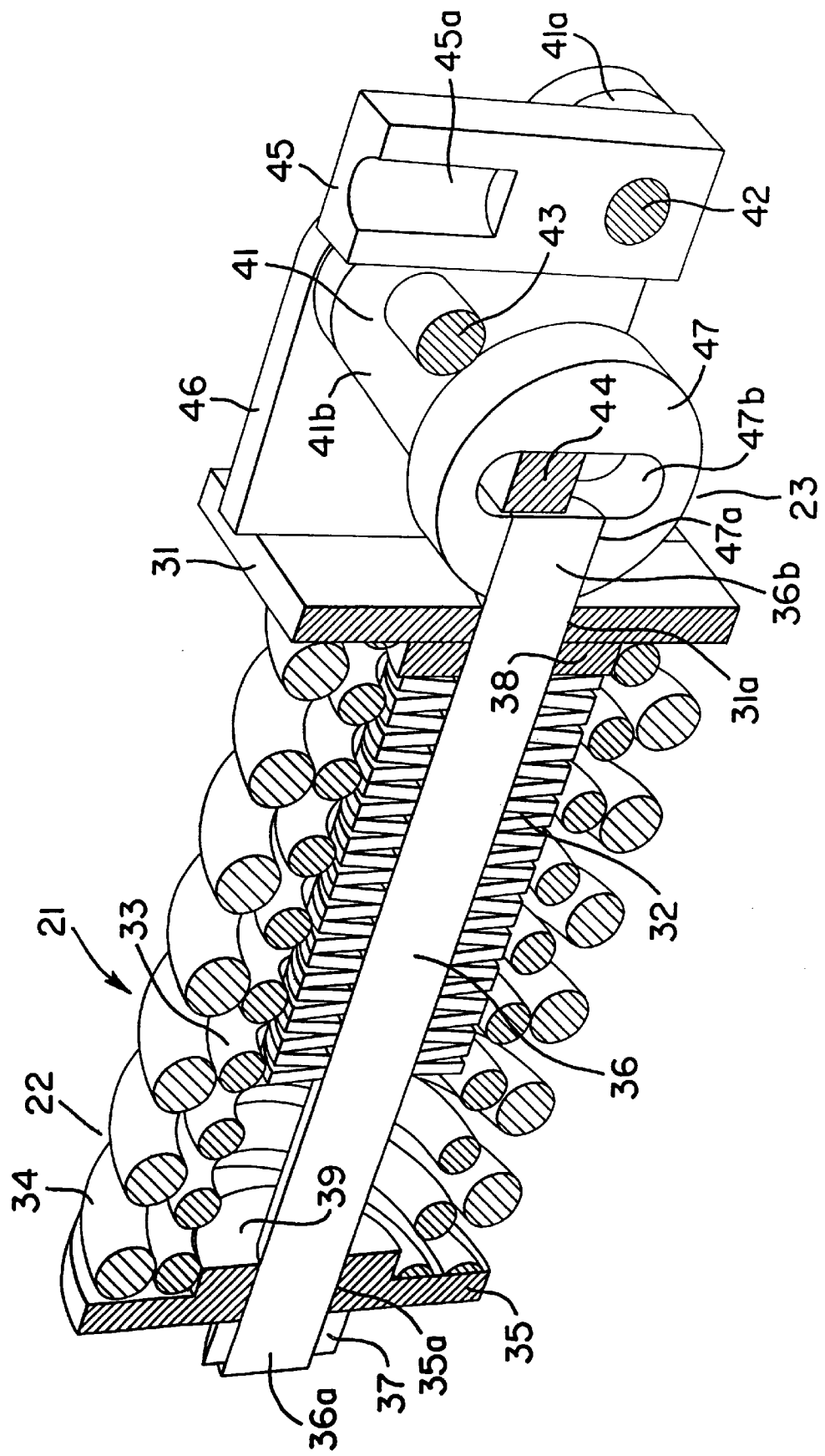
FIG. 2 is a cross-sectional, isometric view of the spring assembly and mechanical linkage assembly of the fuel cell stack compression system shown in FIG. 1.

As shown in FIG. 1 and in more detail in FIG. 2, each coupling mechanism includes a spring assembly 22 situated under the second plate 3 of the stack and a mechanical linkage assembly 23 linking the spring assembly 22 to the end of the associated tie rod. In accordance with the invention, the combination of each spring assembly 22 and its associated mechanical linkage assembly 23 is adapted to cause translation movement provided by the spring assembly to be converted into a movement of the associated tie rod between the first and second end plates 2 and 3 of the stack 1 without rotation of the spring assembly. In particular, horizontal movement by the spring assembly is converted in this way into a vertical movement of the associated tie rod, to thereby maintain a desired compressive force between the end plates of the stack.

As seen more clearly in FIG. 2, each spring assembly 22 includes a base plate 31 which is rigidly mounted under the fuel cell stack 1. One or more springs, shown in FIG. 2 as a series of concentric parallel springs 32, 33 and 34, are disposed so that a first end of each spring is adjacent the base plate 31. These springs then extend toward a second captivating plate 35 and have their second ends adjacent this plate. A shaft 36 is routed along the central axis of the springs 32–34. One end 36a of the shaft passes through an aperture 35a in the captivating plate 35 and is held to the plate by a nut 37. The other end 36b of the shaft passes through an aperture 31a in the base plate 31 and connects to the mechanical linkage assembly 23. With this configuration for the spring assembly 22, the one or more springs of the assembly can be placed in compression at an initial state of the fuel cell stack and then allowed to expand as the stack geometry changes to provide the necessary horizontal translation movement and, in turn, the necessary vertical translation movement of the associated tie rod to accommodate for these changes.

In the present embodiment of FIG. 2, the two outermost springs 33–34 of the spring assembly 22 are coil springs. The innermost spring 32, in turn comprises a stack of belleville spaced from the base plate 31 by a spacer disk 38. The thickness of this disk and the corresponding spacer disk 39 situated at the captivating plate 35 are selected so that the belleville disks begin to be compressed at a predetermined point in the stroke of the shaft 36. The disks also serve to properly position the coil springs 33–34 along the axis of the shaft. The combination of spacers and belleville disks additionally provide a positive stop for the shaft 36 internal to the spring assembly once the belleville disks have been completely flattened. This feature is important during initial compression of the fuel cell stack so that a very high pressure can be applied to the stack without the need for external stop mechanisms and without yielding of the springs.

As above-described, the horizontal movement of each spring assembly 22 is coupled as a vertical movement to an associated tie rod via the associated linkage assembly 23. As shown in FIG. 2, each linkage assembly 23 includes a rigid lever arm 41 and three pins 42, 43 and 44. A first pin 42 is rotatably mounted at a first end 41a of the lever 41 and connects to a block 45 having a seating area 45a for seating an associated tie rod. A second pin 43 is mounted to a base frame 46 which is connected to the base plate 31. The lever arm 41 is rotatably mounted at its central area 41b to the pin 43 which acts as the pivot point of the lever arm. A third pin 44 is rotatably mounted at a second end 41c of the lever arm 41 and is used to transfer the translational movement of the shaft 36 of the spring assembly 22 to the lever arm 41.

As can be appreciated, the pins 42 and 44 are arranged with a finite radius from pin 43. As a result, the pin 42 and the pin 44 will move in a circular arcuate path about the pin 43. To accommodate the horizontal and vertical translation resulting from this arcuate path, the aforementioned block 45 connecting the lever arm 41 to the associated tie rod is allowed to rotate. This results in a slight angle change of the tie rod relative to the stack face. As the tie rod tends to be long, the angular change of the rod is typically small and results in very little impact on the achieved stack load.

As is apparent, the movement of the shaft 36 of the spring assembly 22 is coupled to the lever arm 41 via the pin 44. Since the shaft movement is confined to horizontal translation due to the base plate 31 being fixed and since the pin 44 undergoes both horizontal and vertical translation due to its arcuate rotation as the lever arm 41 rotates, in order to accommodate these different types of movement, the mechanical linkage assembly 23 is further provided with a sliding bearing 47 to couple the shaft 36 to the pin 44.

More particularly, as shown in FIG. 2, the bearing 47 has a threaded hole 47a which receives the second end 36b of the shaft 36 so that the bearing is urged horizontally with the horizontal movement of the shaft. The bearing also includes a central slot 47b in which the pin 44 of the mechanical linkage assembly is received. As a result, as the bearing 47 moves horizontally, the pin 44 moves horizontally with the bearing, while also sliding vertically in the slot 47b. The pin 44 is thus allowed to undergo horizontal and vertical movement to accommodate the arcuate path followed by the pin as a result of rotation of the pin with the lever arm 41.

Figure 4C:
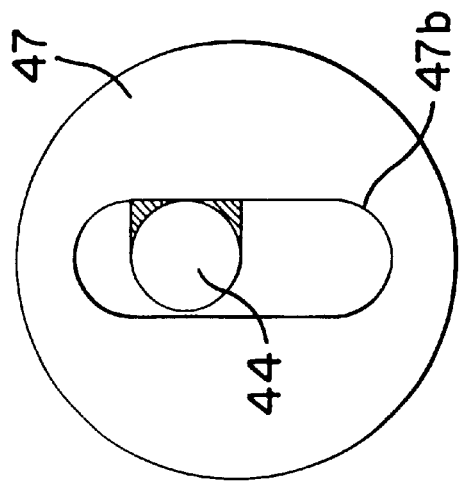
FIGS. 4A–4C are schematic illustrations of different configurations which can be used for the slotted bearing and the pin of the mechanical linkage assembly of the fuel cell stack compression system of FIG. 1.
Figure 4B:
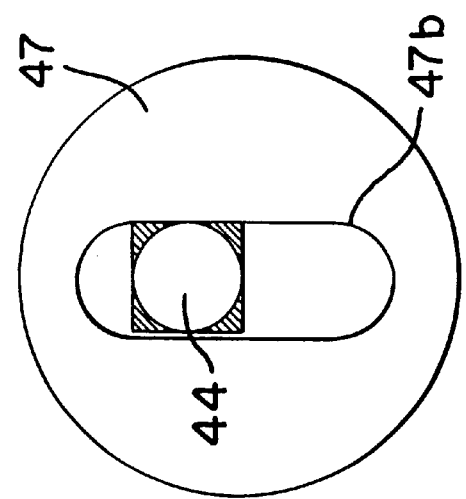
Figure 4A:
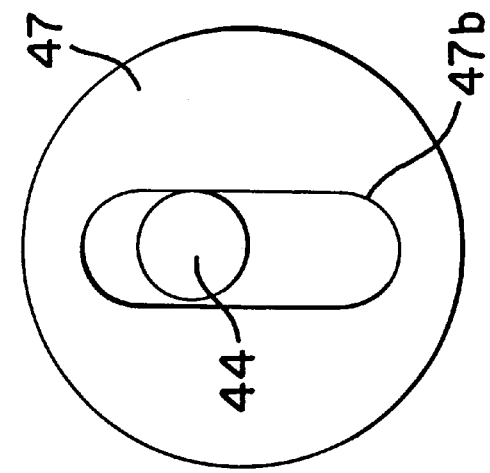

In order to facilitate smooth sliding of the pin 44 within the slot 47b, the pin and slot surfaces may be polished and hardened to reduce friction between them. Alternately, a ball or roller bearing may be used to mount pin 44 in the slot 47b, thereby allowing the pin to rotate within the lever arm and roll with respect to the slot. Another pin configuration would be a pin with a flat portion in contact with the slot so as to provide less contact pressure on the slot and have less likelihood of binding. Further reduction in sliding friction between pin 44 and the slot 47b could also be easily achieved through the use of a lubricant or lubricating coating on the pin and/or slot FIGS. 4A–4C illustrate some of the above and other pin configurations usable for the pin 44. In FIG. 4A, the pin 44 is of round configuration. In FIG. 4B, the pin 44 has a square configuration and in FIG. 4C the pin 44 has a semi-square configuration.

Figure 3C:
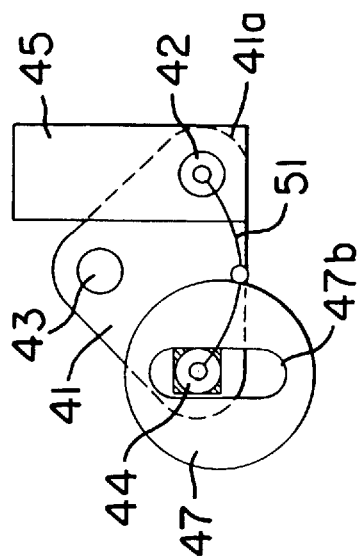
FIGS. 3A–3C are schematic diagrams of the mechanical linkage assembly of the fuel cell stack compression system of FIG. 1 in the fully compressed, half compressed and non compressed states, respectively.
Figure 3B:
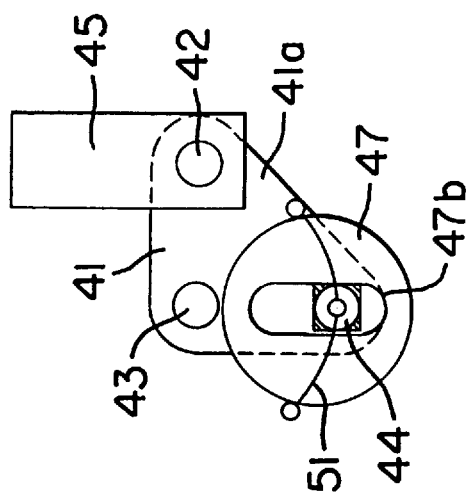
Figure 3A:
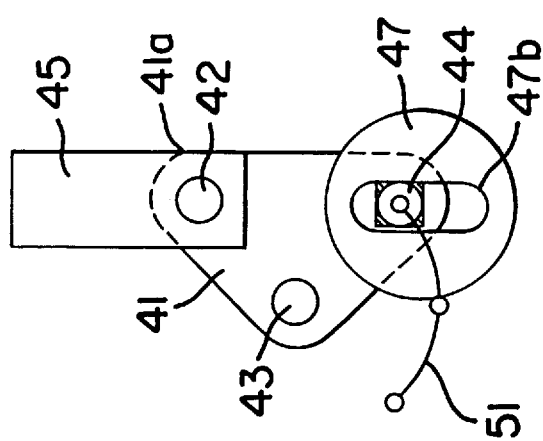

The operation of the compression system 11 can be understood by reference to FIGS. 3A–3C which show various positions of the linkage assemblies 23 during operation of the fuel cell stack 1. FIG. 3A illustrates the position of the linkage assemblies when the stack is placed in operation. At this time, the spring assemblies 22 of the compression system 11 are fully compressed so that the compression system is under maximum compression. The lever arms 41 have thus been fully rotated so that their ends 41a and pins 42 are at the highest vertical position. This places the blocks 45 and the tie rods 1417 also in their highest upward positions, thereby creating the necessary compressive force on the end plates 2 and 3 of the stack via the tie bars 12 and 13. At this time, the pins 44 are at their most outward positions horizontally and at their highest positions vertically in their arcuate paths 51.

FIG. 3B illustrates the linkage after the stack has been in operation and the geometry, i.e. the height, of the stack has reduced to a point where the compression system 11 is under half compression. At this time, the lever arms 41 are at half rotation so that the ends 41a and the pins 42 are at half their highest vertical position. This places the blocks 45 and the tie rods 14–17 at half their maximum vertical positions, thereby maintaining the necessary compressive force on the stack end with the reduced height of the stack. In this case, the pins 44 have been moved horizontally to their mid horizontal positions and to their lowest vertical positions in their arcuate paths 51.

Finally, FIG. 3C shows the linkage assemblies after the stack has reached an operating condition where little if any further shrinkage of the stack is expected and the compression system is under no compression. At this time, the lever arms 41 have moved to a position where their ends 41a and the pins 42 are at their lowest vertical position. This places the blocks 45 and the tie rods 14–17 at their lowest vertical positions, thereby again maintaining the necessary compressive force on the stack end plates with the reduced height of the stack. At this time, the pins 44 have moved to their most inward positions horizontally and to their highest positions vertically in their arcuate paths 51.

As can be appreciated, with the compression system 11 of the invention, the shrinkage of the stack 1 is accommodated while maintaining the desired compressive force on the stack. This is accomplished with spring assemblies which can be located under the end plate 2 of the stack, but which do not have to be rotated. As a result, the space requirements for these assemblies and the complexity of the assemblies is significantly reduced. This, in turn, provides an overall more compact and less expensive system.

While the spring assemblies 22 of the compression system 11 of FIGS. 1 and 2 have been shown as using three concentric springs, any number of one or more springs may be used to generate the desired load versus deflection characteristic for each spring assembly. In addition, while the invention has been illustrated with coil springs and belleville disk packs for the spring assemblies, any other resilient member which can be placed in compression may be used as the one or more springs.

It should also be noted that the mechanical linkage assemblies 23 can be other than the assemblies illustrated. Alternate configurations include rack and pinion gear sets, cable pulley systems or any other mechanisms capable of redirecting the horizontal movement of the spring assembly to a vertical movement without rotation of the spring assembly.

In a further aspect of the present invention, and as shown in FIG. 2, the concentric springs 32–34 of the spring assemblies are formed so that one or more of the springs have varying or different lengths so as to provide a non-linearly, decreasing load or compressive force on the fuel cell stack 1 as it shrinks. In the case shown, the belleville disk pack 32 is of shorter length than the coil springs 33 and 34. This is advantageous in providing good consolidation pressure early in stack life while minimizing the long term, total stack shrinkage.

Figure 5:
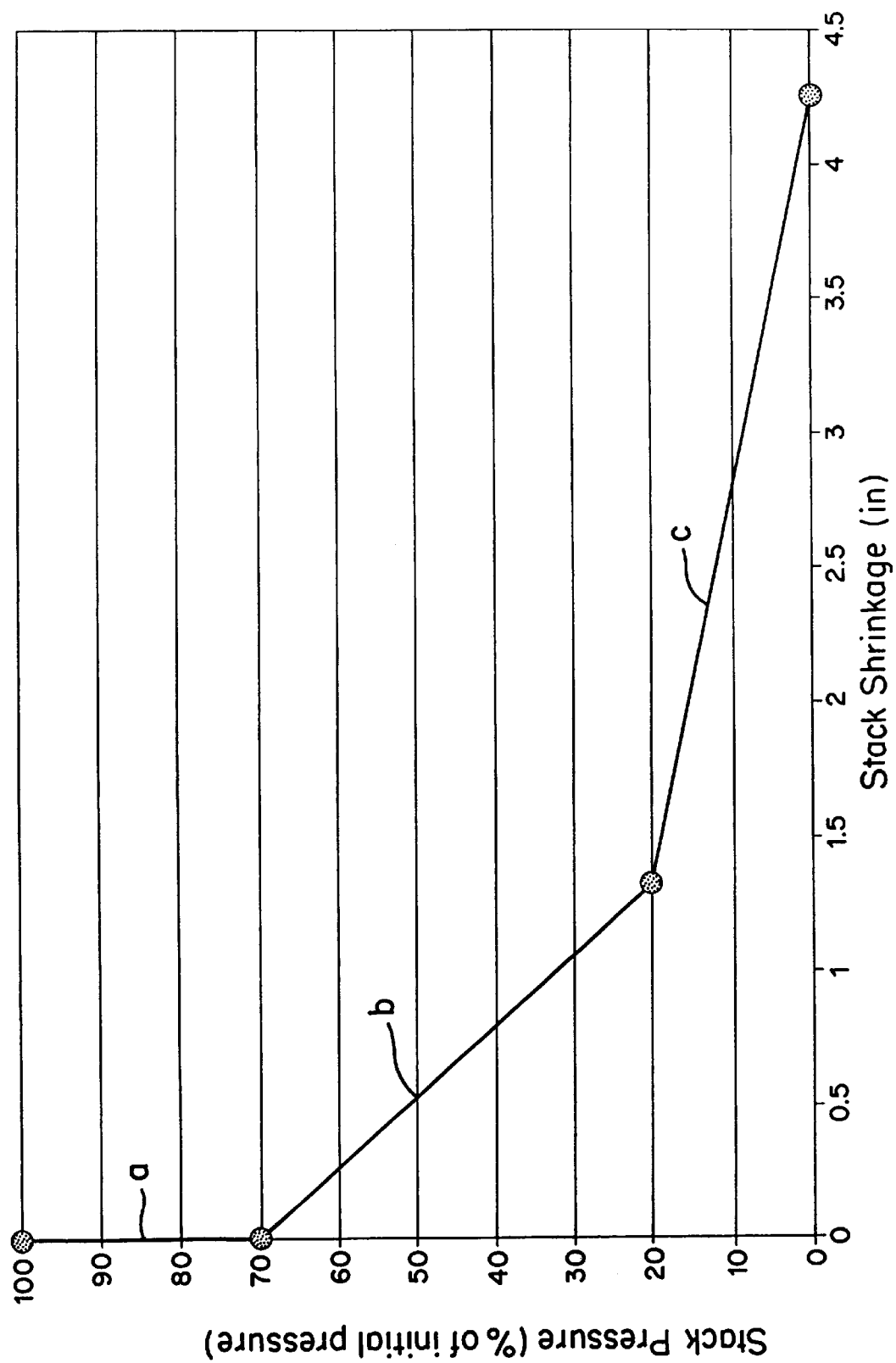
FIG. 5 is a graph illustrating one possible stack loading profile achievable with the fuel cell stack compression system of FIG. 1.

FIG. 5 is a graph displaying one possible stack loading profile achievable with the concentric springs 32–34. In the load profile of FIG. 5, a high load is applied at the beginning of stack life and this load decreases non-linearly as the stack shrinks.

More particularly, section a of the load curve represents the point at which the belleville disk packs 32 of the spring assemblies of the compression system of FIG. 1 are fully flattened or compressed. Section b of the load curve is achieved when both coil springs 33–34 and the belleville disk packs 32 of the spring assemblies are working together in parallel and in partial compression. Section c of the load curve is achieved when the belleville disk packs are no longer compressed and only the coil springs 33–34 are partially compressed and applying a force or load.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A compression system for providing a compressive force to a fuel cell stack having first and second ends, said compression system comprising:
   one or more members each connected to said first end of the stack and extending to said second end of said stack;
   and one or more coupling mechanisms situated adjacent the second end of the stack, each said coupling mechanism being coupled to a different one of said one or more members and including: a spring assembly and a linkage assembly together adapted to convert a translation movement provided by the spring assembly into a movement of an associated member of the one or more members in a direction transverse to said translation movement and between the first and second ends of the stack without rotation of the spring assembly, the associated member being the member to which the coupling mechanism which includes the spring assembly and the linkage assembly is coupled.

2. A compression system in accordance with claim 1, wherein;
   each said spring assembly is adapted to provide a horizontal translation movement; and
   each said linkage assembly includes: a lever arm; first, second and third pins, said first pin being attached to one end of said lever arm and coupled to an end of the associated member, said second pin serving as a pivot point for the lever arm, and said third pin being mounted to the second end of the lever arm; and a bearing having a slot, said third pin being situated in said slot of said bearing, and said bearing being engaged by said spring assembly to move horizontally in response to said horizontal movement of said spring assembly.

3. A compression system in accordance with claim 2, wherein:
   each said spring assembly is horizontally situated opposing the second end of the fuel cell stack and includes; a fixed base plate; a captivating plate spaced from the fixed base plate, one or more springs situated between said base plate and said captivating plate; and a shaft extending horizontally through a center of the one or more springs, a first end of said shaft being attached to said captivating plate and a second end of said shaft engaging said linkage assembly; and
   the bearing of each said linkage assembly is engaged by the second end of the shaft of the spring assembly which is included in the coupling mechanism which includes the linkage assembly.

4. A compression system in accordance with claim 3, wherein:
   each said linkage assembly further includes; a seating block connected to said first pin and into which the end of the associated member is seated; and a base frame abutting said base plate, said second pin being mounted to said base frame and extending through an aperture in said lever arm.

5. A compression system in accordance with claim 4, wherein;
   said fuel cell stack includes first and second end plates disposed at said first and second ends of said fuel cell stack;
   said compression system further includes one or more rigid tie bars extending across said first end plate;
   each of said one or more members is a rigid tie rod connected to a tie bar and extending along a face of said fuel cell stack; and
   each said spring assembly is disposed opposing said second end plate.

6. A compression system in accordance with claim 3, wherein:
   said fuel cell stack includes first and second end plates disposed at said first and second ends of said fuel cell stack;
   said compression system further includes one or more rigid tie bars extending across said first end plate;
   each of said one or more members is a rigid tie rod connected to a tie bar and extending along a face of said fuel cell stack; and
   each said spring assembly is disposed opposing said second end plate.

7. A compression system in accordance with claim 6, wherein:
each said spring assembly comprises a plurality of concentric springs.

8. A compression system in accordance with claim 7, wherein:
at least two of said plurality of springs in an uncompressed state are of different length to provide a non-linear, decreasing load to said fuel cell stack.

9. A compression system in accordance with claim 7, wherein:
each said spring assembly includes an inner spring in the form of a belleville disk pack, a middle coil spring and an outer coil spring.

10. A compression system in accordance with claim 9, wherein:
said belleville disk pack is of shorter length in an uncompresed state than said middle and outer coil springs in an uncompressed state.

11. A compression system in accordance with claim 9, wherein:
each said spring assembly includes one or more stop members disposed at one or more ends of said shaft to prevent permanent deflection of said springs.

12. A compression system in accordance with claim 3, wherein:
each said spring assembly includes one or more stop members disposed at one or more ends of said shaft to prevent permanent deflection of said springs.

13. A compression system in accordance with claim 12, wherein;
each of said spring assemblies comprises a plurality of springs; and
at least two of said plurality of springs in an uncompressed state are of different length to provide a non-linear, decreasing load to said fuel cell stack.

14. A compression system in accordance with claim 3, wherein:
each of said spring; assemblies comprises a plurality of springs; and
at least two of said plurality of springs in an uncompressed state are of different length to provide a non-linear, decreasing load to said fuel cell stack.

15. A compression system in accordance with claim 2, wherein;
each said spring assembly includes: one or more springs; and one or more stop members disposed to prevent permanent deflection of said springs.

16. A compression system in accordance with claim 15, wherein each
each said spring assembly includes a plurality of springs;
at least two of said plurality of springs are of different length to provide a non-linear decreasing load to said fuel cell stack.

17. A compression system in accordance with claim 2, wherein:
each said spring assembly includes a plurality of springs, and at least two of said plurality of springs are of different length to provide a non-linear, decreasing load to said fuel cell stack.

18. A compression system for providing a compressive force to a fuel cell stack having first and second ends, said fuel cell stack compression system comprising:
one or more members each connected to said first end of the stack and extending to said second end of said stack;
and one or more coupling mechanisms situated adjacent the second end of the stack, each said coupling mechanism being coupled to a different one of said one or more members and including: a spring assembly and a linkage assembly together adapted to convert a translation movement provided by the spring assembly into a movement of an associated member in a direction transverse to said translation movement and between the first and second ends of the stack, the associated member being the member to which the coupling mechanism which includes the spring assembly and the linkage assembly is coupled, and the spring assembly including a plurality of concentric springs which in the uncompressed state are of different length to provide a non-linear, decreasing load to said fuel cell stack.

19. A compression system in accordance with claim 18, wherein.
each said spring assembly includes one or more stop members disposed to prevent permanent deflection of said springs.

20. A compression system in accordance with claim 18, wherein:
each said spring assembly includes an inner spring in the form of a belleville disk pack, a middle coil spring and an outer coil spring.

21. A compression system in accordance with claim 20, wherein:
said belleville disk pack in an uncompressed state is of shorter length than said middle and outer coil springs in an uncompressed state.

22. A compression system in accordance with claim 18, wherein:
said fuel cell stack includes first and second end plates disposed at said first and second ends of said fuel cell stack;
said compression system further includes one or more rigid tie bars extending across said first end plate;
each of said one or more members is a rigid tie rod connected to a tie bar and extending along a face of said fuel cell stack; and
each said spring assembly is disposed opposing said second end plate.

23. A fuel cell system comprising:
a fuel cell stack having first and second ends; and
a compression system including: one or more members each connected to said first end of the stack and extending to said second end of said stack; and one or more coupling mechanisms situated adjacent the second end of the stack, each said coupling mechanism being coupled to a different one of said one or more members and including: a spring assembly and a linkage assembly together adapted to convert a translation movement provided by the spring assembly into a movement of an associated member in a direction transverse to the translation movement and between the first and second ends of the stack without rotation of the spring assembly, the associated member being the member to which the coupling mechanism which includes the spring assembly and the linkage assembly is coupled.

24. A fuel cell system comprising:

a fuel cell stack having first and second ends; and a compression system including: one or more members each connected to said first end of the stack and extending to said second end of said stack; and one or more coupling mechanisms situated adjacent the second end of the stack, each said coupling mechanism being coupled to a different one of said one or more members and including, a spring assembly and a linkage assembly together adapted to convert a translation movement provided by the spring assembly into a movement of an associated member in a direction transverse to the translation movement and between the first and second ends of the stack, the associated member being the member to which the coupling mechanism which includes the spring assembly and the linkage assembly is coupled, and the spring assembly including a plurality of concentric springs which in the uncompressed state are of different length to provide a non-linear, decreasing load to said fuel cell stack.

* * * * *

UNITED STATES PATENT AND TRADEMARK OFFICE
CERTIFICATE OF CORRECTION

PATENT NO. : 6,413,665 B1
DATED : July 2, 2002
INVENTOR(S) : Scott Blanchet et al.

It is certified that error appears in the above-identified patent and that said Letters Patent is hereby corrected as shown below:

<u>Column 1,</u>
Line 3, insert -- STATEMENT AS TO RIGHTS TO INVENTIONS MADE UNDER FEDERALLY SPONSORED RESEARCH AND DEVELOPMENT
This invention was made with Government support under contract DE-FC21-95MC31184 awarded by the Department of Energy. The Government has certain rights in the invention. --.

Signed and Sealed this

Second Day of May, 2006

JON W. DUDAS
*Director of the United States Patent and Trademark Office*